Jan. 19, 1965 C. H. BRUMLEY 3,166,625

OPTICAL CRYPTOGRAPHIC DEVICE

Filed Feb. 7, 1962 3 Sheets-Sheet 1

INVENTOR.
CORWIN H. BRUMLEY
BY Frank C. Parker
David E. Dougherty
ATTORNEYS

INVENTOR.
CORWIN H. BRUMLEY
BY Frank C. Parker
David E. Dougherty
ATTORNEYS

INVENTOR.
CORWIN H. BRUMLEY
BY Frank C. Parker
David E. Dougherty
ATTORNEYS

United States Patent Office 3,166,625
Patented Jan. 19, 1965

3,166,625

OPTICAL CRYPTOGRAPHIC DEVICE

Corwin H. Brumley, Penfield, N.Y., assignor to Bausch & Lomb Incorporated, Rochester, N.Y., a corporation of New York Filed Feb. 7, 1962, Ser. No. 171,661
6 Claims. (Cl. 88—1)

This invention relates to an optical cryptographic device of the type including screens of optical dissector elements, and more particularly, to an improved optical cryptographic device of the type disclosed in the copending application of Meltzer and Ferris, Serial Number 61,270 filed October 7, 1960, and assigned to the same assignee as the present application.

The cryptographic device of the present invention will be particularly useful in commercial fields, such as the banking and the credit fields wherein substantial economies and improved efficiency may be realized by having each bank depositor or person to whom credit is extended, carry his own identification card bearing his personal signature or other identifying subject matter. In those instances where this is presently done, the signature or other matter appear in clear text, with a resultant risk of forgery in the event the card is lost and then found by an unscrupulous person. It is understood that personal credit companies have experienced substantial losses in this way. There is, accordingly, a relatively large potential demand for a cryptographic device which permits the identifying subject matter to be placed on personal identification cards in cryptographic form, so as to be substantially meaningless to a casual finder. The cryptogram should also be readily decipherable for comparison with a signature made by the person presenting the card at the time of its presentation. Banks, particularly savings banks, have indicated a desire to adopt such a system, placing personal signature cryptograms on their savings account pass books, thereby permitting their tellers to make instantaneous signature comparisons without the need to leave their cages to consult a central file of signature cards.

The device of the present invention, is of course, not limited to such fields, but may also be applied in many other fields, and for other purposes, wherever an optical cryptographic device has application. Devices according to the invention may be easily produced by mass production techniques at a relatively low cost. They are readily adaptable to the use of cryptographic keying techniques, so that several different cipher keys may be used within a single system, thereby enabling the achievement of a relatively high degree of cryptographic security.

The improved optical cryptographic devices, according to the present invention, are particularly advantageous where it is desirable to obtain a cryptogram having a relatively high degree of complexity. Such a cryptogram will be more complex than a cryptogram encoded by a device disclosed in the aforementioned copending application. The increased complexity has little if any effect on the enciphering or deciphering speed, or on the operation of the device. Furthermore, the increased complexity is obtainable at a relatively small increase in cost.

Briefly, an optical cryptographic device, according to the presently preferred embodiment of the invention, includes means for defining a field of limited area in a selected plane, and a plurality of optical screens. The optical screens comprise image-forming elements, which are effective to direct the image to an image plane. The screens are spaced from the object plane for forming aerial images of portions thereof in a selected image plane. The image-forming elements are small relative to the area of the field, so that the aerial images formed by the screen are differently oriented relative to each other from the orientation of the corresponding portions of the object plane.

Preferably, the sizes of the image forming elements are selected in view of the subject matter to be enciphered to insure the formation of a difficultly decipherable cryptogram. For enciphering personal signatures, for example, it has been found that an element dimension of about one tenth inch, provides optimum or near optimum cryptographic security.

The term aerial image also includes an intermediate image. For example, an intermediate or aerial image may be formed between two lens surfaces wherein the spaced surfaces are formed in a solid piece of transparent material.

Several representative embodiments of the invention will now be described in detail in connection with the accompanying drawings, in which.

Figure 1:
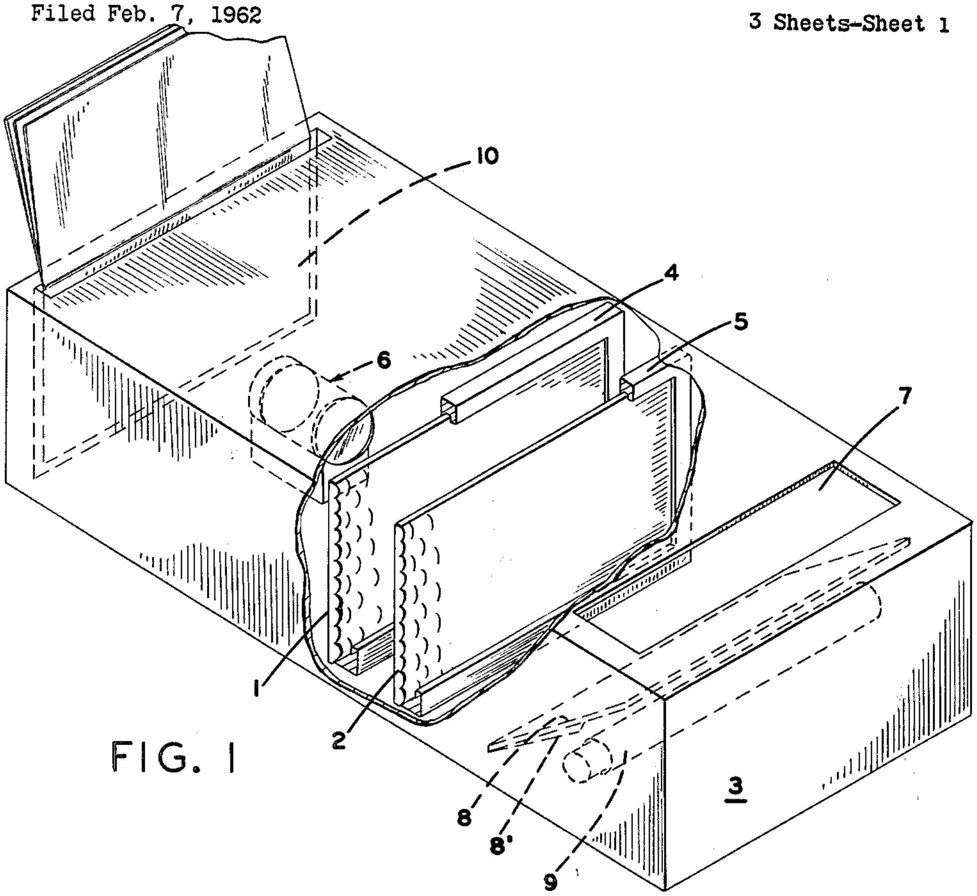
FIG. 1 is an isometric view partly schematic illustrating a cryptographic device according to the invention and including means for printing optically encoded information.
Figure 2:
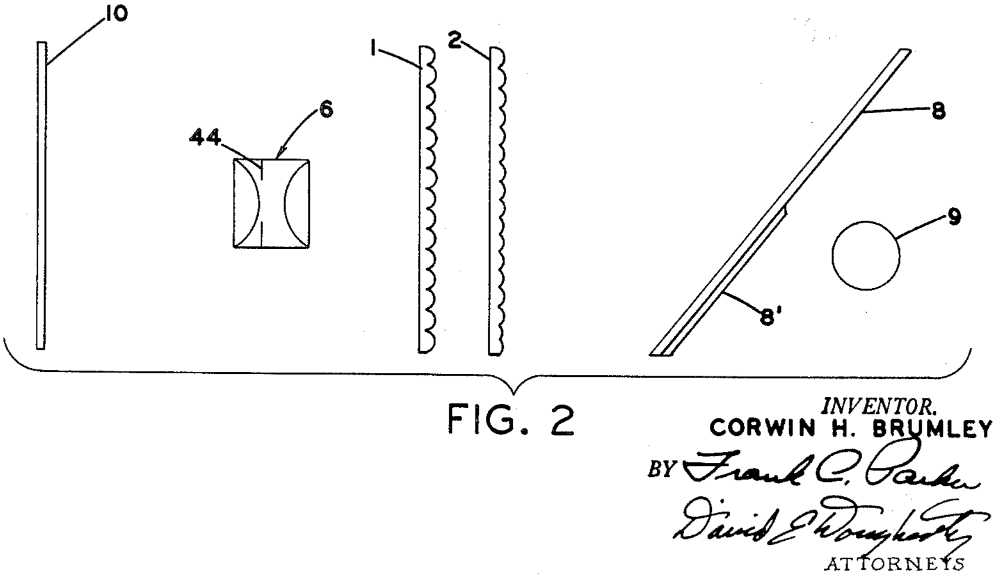
FIG. 2 is a cross sectional view partly schematic of the device shown in FIG. 1.

Referring now more particularly to FIGS. 1 and 2, an optical cryptographic device is shown which includes means for enciphering information and means for printing a resulting cryptogram.

The cryptographic device includes a pair of optical screens 1 and 2 mounted in a housing 3 by any desired means, such as, the frames 4 and 5. A relay objective lens 6 is also mounted in the housing 3, spaced from and axially aligned with the screens 1 and 2.

An opening 7 in the top of the housing 3 is adapted to receive a signature card (not shown) or a card bearing information which is to be enciphered. A half silvered mirror 8 and light source 9 are arranged to project an image of the signature card through the screens 1, 2 and lens 6. The mirror 8 includes an opaque coating 8′ which shields the screen 2 from direct light rays.

The light source 9 is connected to a source of electric current (not shown) and illuminates the signature card by episcopic illumination by light rays passing through the mirror 8. The cryptogram is formed on a sensitized card 10 which is inserted in the receptacle 11. The card 10 is then subjected to a developing process.

In operation a cryptogram may be formed by illuminating a signature card which is placed face down over the opening 7. An image of the illuminated signature is reflected by the mirror 8 onto and through the screen 2 and screen 1. The screen 2 forms an aerial image of portions of the signature which are differently oriented relative to each other from the relative orientations of the corresponding portions of the signatures. The screen 1 forms a second set of aerial images of portions of the first set of aerial images formed by the screen 2. The second set of aerial images are differently oriented relative to each other from the relative orientations of the corresponding respective portions of the first aerial images.

The resulting aerial image is projected onto the card 10 by the relay objective lens 6. After the card 10 is exposed it is subjected to a developing process and includes the optically encoded information in cryptographic form.

If all of the optical elements in a screen are of equal power, the aerial images are all formed in a common plane. If the elements are of various different powers, the images lie in different planes. The relay objective 6 is stopped down so that its depth of field is at least sufficient to accommodate all of the aerial images formed by the screen 4 in the event that the elements therein are of different powers.

The objective 6 includes an aperture stop 44, which may be in the form of an inter-element diaphragm, as illustrated, or in any other desired form. The stop 44 acts to restrict the degree of overlap between adjacent image portions in the final composite image, even though there may be a large degree of overlapping among the aerial images formed by the array 1. The final image projected upon the card 10 thus represents selected portions of the aerial images formed by the array 1, with overlapping portions present only to a controlled extent. Images of the different portions of the signature projected through different ones of the elements in the screens 2 and 1 are optically rotated separately about the axis of the respective elements, so that their relative orientations in the aerial images and also in the final image are different from the relative orientations of the corresponding portions of the signature.

The restrictions of overlap of adjacent portions of the final composite images are important in order to avoid excessive loss of contrast during reconstruction of the orignial subject matter when it is desired to decipher the cryptogram.

Figure 3:
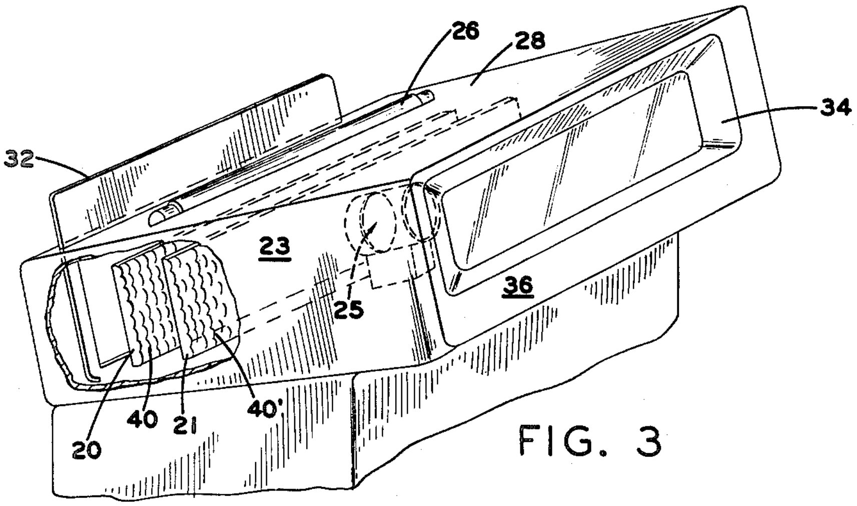
FIG. 3 is a perspective view partly broken away, of an optical cryptographic device according to the presently preferred embodiment of the invention including a pair of optical screens comprising spherically curved elements, and a relay lens including an aperture stop.
Figure 4:
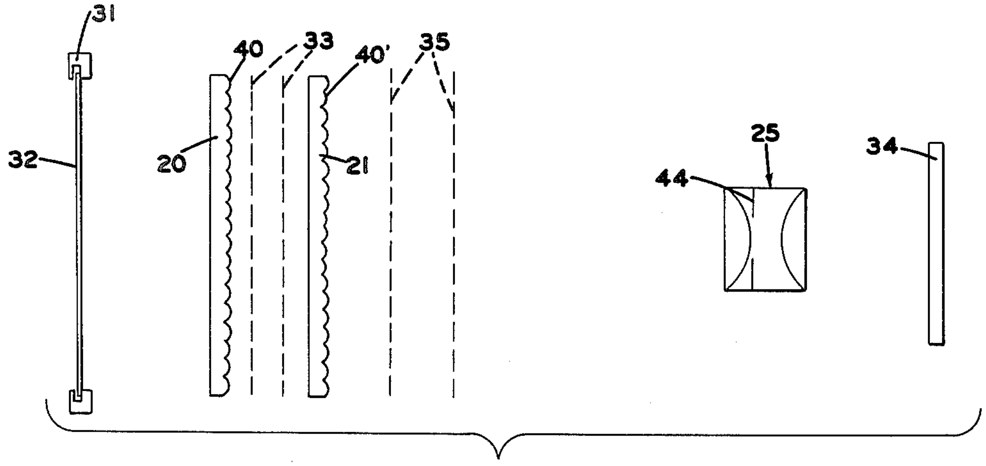
FIG. 4 is a cross-sectional view of the device shown in FIG. 3.
Figure 5:
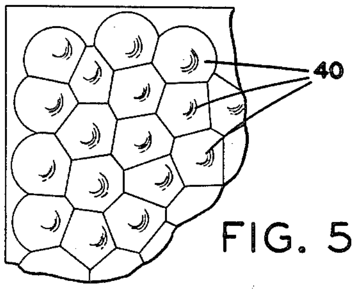
FIG. 5 is a fragmentary elevational view on an enlarged scale of the optical screen shown in FIGS. 3 and 4.

FIGS. 3, 4 and 5 illustrate a cryptographic device, according to a presently preferred embodiment of the invention. The device includes a pair of lenticular screens 20 and 21, mounted in a housing 23, by any desired means. A relay objective lens 25 is also mounted within the housing 23, spaced from and axially aligned with the screens 20 and 21. A light 26 is carried in a top portion 28 of the housing 23 between the screen 20, and a card holder.

The card holder comprises a conventional slot 30 and grooves 31 adapted for receiving and supporting a card 32. The card 32 is illuminated by means of the light 26 and viewed through an opening 34 in one end wall 36 of the housing 23. A screen 34 is carried in the front portion 36 of the housing 23 and forms the front wall thereof.

In operation, a cryptogram may be deciphered from a card 32, bearing the enciphered signature or other identifying subject matter. The card 32 is placed in the slot 30 in the housing 23, where it is supported generally parallel to and spaced from the screens 20 and 21. The cryptogram is illuminated, by the light 26. The pair of optical screens 20 and 21 form aerial images of different portions of the text in the regions designated by the dashed lines 33 and 35. If the optical elements 40 of a single screen are of equal power, the aerial images formed by that screen are all formed in a common plane. If the elements 40 are of various different powers, the images lie in different planes.

The relay objective lens 25, relays selected portions of the images formed by the screen 21 to the screen 34 which is supported in the front portion 36 of the housing 23. The objective 25 is stopped down so that its depth of field is at least sufficient to accommodate all of the aerial images formed in the region 35 in the event optical elements 40 are different respective powers, and to focus the final composite image upon the screen 34.

If the cryptogram is full-scale, that is, if it is substantially the same size as the original clear text, it may be deciphered by placing a screen (not shown) in the region 35, i.e., at the plane ordinarily occupied by the aerial image. The cryptogram is illuminated, so that, it is imaged through the screen 20, 21 upon the screen placed at the aforementioned plane. However, because of the effect of overlap, as discussed in greater detail hereinafter, the image formed without the relay lens 25 suffers greater loss of contrast than an image formed from an aerial image projected through the relay lens. This comes about because of the effect of the stop 44, which acts to direct the rays of the aerial image toward different respective elements of the screen 21.

Alternatively, if the cryptogram is of a different size from the original text, it may be deciphered by direct projection through a screen of optical elements generally similar to the screen with which the cryptogram was originally made, but scaled in size according to the scale ratio between the original clear text and the cryptogram. For example, if the cryptogram is smaller than the original clear text by a ratio of 2 diameters, it may be deciphered by the projection through a screen of optical imaging elements or an image dissector screen, smaller than the original array by 2 diameters, and otherwise exactly similar to it.

In order to achieve maximum cryptographic security, it is desirable to limit the extent of image duplication, that is, to limit the number of images of individual area portions of the clear text that appear in the final composite image constituting the cryptogram. The extent of image duplication would be determined largely by the sizes of the elements 40 and the conjugate ratios at which they work. The amount of duplication will vary inversely in accordance with the element size.

If the conjugates are chosen to produce a relatively large minification, there would be a relatively large amount of image duplication, because each element will form an aerial image including a relatively large area portion of the text. It is possible, by appropriate choices of conjugates, to have each element form a separate image of the entire text so that the final cryptogram would merely be an array of complete images of clear text on a greatly reduced scale. This would defeat the purpose of the device.

It is necessary optically to divide up the clear text into different area portions without excessive duplication of images of different adjacent portions of the text. Preferably, image duplication in the final cryptogram is restricted to power of about four times, at a first approximation. Toward this end, the elements 40 and 40′ of the screens are preferably arranged to operate at conjugates such that the aerial images are at least of about one half scale relative to the object surface.

The actual image duplication in the cryptogram is subject to several different effects, including not only the working conjugates of the elements 40, but also the size of the aperture stop 44, and the position of the different respective elements relative to the optical axis of the stop 44. Some of the duplication will be fully illuminated, because the entire cones of rays forming them will pass through the aperture stop 44. Others will be only dimly illuminated because the cones of rays forming them are partly excluded from the final image surface by the stop 44. The term "first approximation" as used herein in respect of image duplication, refers only to those duplicate images that are fully illuminated.

The entire aerial image formed by each element will usually be substantially larger than the size of the element itself, and to this extent, the aerial images overlap each other.

Excessive overlapping of the separate images in the final composite image, which constitutes the cryptogram, causes confusion due to lack of contrast when it is attempted to decipher the crytogram. The relay objective lens 25 restricts the degree of overlapping of the individual images in the final composite image, to a value greatly below the degree of overlap present in the aerial images. The surprisingly large degree of overlap is tolerable in the final composite image, however especially when working with a white text on a black background.

Preferably, at least about one-ninth of the area of each image portion in the final composite image is substantially free from overlapping in order to avoid excessive loss of contrast in the reconstituted image of the clear text. The stop 44 acts to restrict and to limit the degree of relative overlap of the different image portions in the final composite image. The degree of relative overlap is restricted by restricting the image light rays, receivable from the various different ones of the elements 40, to those rays falling within the area defined by the stop 44, and by the elements 40.

The principal factors that affect the relative ratio in the final composite image are the diameter of the stop 44, the spacing between the stop 44 and the screens 20, 21, the spacing between the screens 20 and 21, the spacing between the screen 21 and the aerial image, and the powers of the various elements 40. The relative overlap ratio is affected to a relatively smal extent by the size of the elements 40.

The relative overlap may be readily controlled in operation of the device by varying the size of the aperture stop 44, which may, if desired, be an adjustable diaphragm.

The elements 40, 40′ are all of positive power, and the space between the respective screens 20 and 21 is greater than the focal length of the strongest one of the elements 40′, and the space between the screen 20 and an object plane defined by the card 32 is greater than the focal length of the strongest one of the elements 40, thereby insuring the formation of a real aerial image in the intermediate region 33, by each one of the elements 40.

The nature of the cryptogram and the difficulty with which it may be deciphered without access to an optical device, similar to the one on which it has been made, depends to a large extent upon the size of the individual elements 40, 40′, relative to the nature of the clear text to be enciphered. Presently available empirical results indicate that the optimum element size in a screen for use in enciphering and deciphering personal signatures is on the order of one tenth inch diameter, or about one hundredth square inch area. Elements of this size produce sufficient confusion in the cryptogram to render it highly difficult to decipher without detailed knowledge regarding the screens 20 and 21 with which it was made.

The objective 25 may be of any desired power. It's selection will depend on the relative size of the final composite image, as well as on the overall size and optical speed desired for the complete device. The selection is also governed by the overlap considerations hereinabove described. At present, it is preferred to use a relatively short focal length objective in order to achieve a minification in the final image relation to the aerial image without making the device an inconveniently large size.

The screens 20 and 21 are composed of a mosaic of optical elements, preferably of preselected shapes which resemble a mosaic or random pattern. The elements may be individually formed and cemented together. Preferably, however, for maximum economy and ease in manufacturing a relatively large number of substantially identical arrays, the array is formed as a unitary mounting or casting of a transparent plastic, such as, for example, polystyrene.

Figure 6:
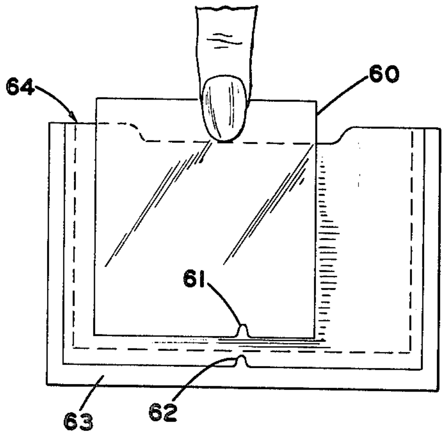
FIG. 6 is a side elevational view illustrating the use of keying techniques in the practice of the invention.

Also, to permit the use of cryptographic keying techniques, as illustrated in FIG. 6, the screens 20 and 21 (shown in FIGS. 3 and 4) are preferably made substantially larger than the size of the portion of the signature card or other subject matter it is desired to encipher. The signature card, or other text to be enciphered, may then be positioned to cover only a selected portion of the object plane, and the cryptogram will be made in accordance with the particular portion of the screens 20 and 21 (see FIGS. 3 and 4) through which it is imaged. Since the elements 40, 40′ are of different shapes and sizes, different portions of the screens 20 and 21 form different respective cipher keys. The text, such as the signature card 60 shown in FIG. 6, may be keyed to a particular position in the object plane by a notch 61 in the edge of the card 60 for engagement with a fixed boss 62 which is in the base 63 of the receptacle 64.

Figure 7:
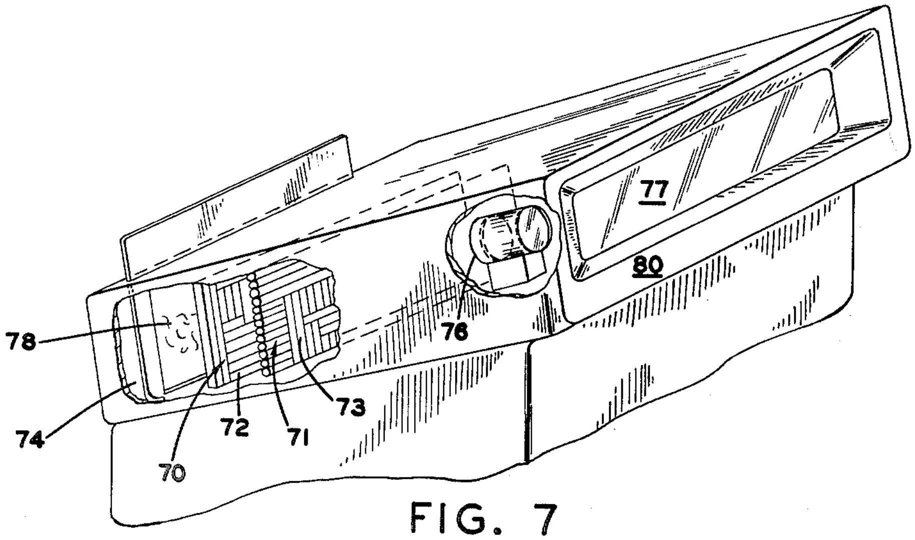
FIG. 7 is a perspective view illustrating a cryptographic device according to a second embodiment of the invention; and, FIG. 8 is a side elevational view illustrating a lens element according to a third embodiment of the invention.

The cryptographic device shown in FIG. 7 is generally similar to the device shown in FIGS. 3 and 4, except that the device shown in FIG. 7 includes a pair of composite, planar screens 70 and 71 of cylindrical lens elements 72 and 73. Different ones of the elements 72 and 73 are differently angularly oriented with respect to other elements in a selected screen and to other elements in a second screen. The screen 70 forms a plurality of partly overlapping aerial images of portions of an object surface 74. The screen 71 forms a plurality of partly overlapping aerial images of portions of the overlapping aerial images formed by the screen 70. The images formed by the screen 71 are then relayed by an objective lens 76 to a final image plane 77. When the screens 70 and 71 are used for enciphering or deciphering personal signatures the elements 72 and 73 are preferably about one-tenth inch wide in their direction of curvature. They may be as long as desired.

As used herein and in the appended claims, the term aerial image is intended to include not only images of the kind formed by spherical lenses, but also partial, or pseudo aerial images of the kind formed by cylindrical lenses, which focus light rays preferentially in directions perpendicular to their cylinder axes.

The relay objective 76 must have a sufficient depth of field to include both the object surface 74 and the aerial images, because in planes parallel to the elements 72 and 73 there is no imaging by the elements, and the relay objective 76 must operate alone to focus the image from the object surface 74 to the final image surface 77.

The device is shown for use in deciphering with a transparency 78, upon which a cryptogram is printed, mounted in the object surface 74, and illuminated from the rear by any convenient light source (not shown). In this arrangement the relay lens 76 relays the aerial images of the transparency 78 which are aerial images in a plane parallel to the screen 71. The screens 70 and 71 optically decipher the aerial image, and the lens 76 projects an image of the original clear text upon the ground glass screen 77 which is positioned in a front wall 80 of the device.

Figure 8:
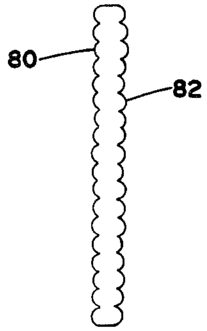

The third embodiment of the invention, shown in FIG. 8, includes a pair of screens or lens surfaces 80 and 82. The lens surfaces 80 and 82 are formed in an integral piece of transparent material such as glass or a thermosetting plastic. The integral piece of material may comprise laminated layers or any similar arrangement wherein the aerial images are formed in an intermediate region between the lens surfaces.

What is claimed is:

1. An optical cryptographic device comprising means defining a limited field in a selected object plane, and a screen comprising relatively small optical image forming elements which are small relative to said field and spaced from said field at an object distance, each of the elements of said screen forming aerial images of relatively small portions of said field at an image distance which is conjugate to said object distance whereby the aerial images formed by said screen are differently oriented relative to each other from the relative orientations of the corresponding respective portions of said field, a second screen of optical image forming elements which are small relative to said field and spaced from said first screen at a second object distance, each of said elements of said second screen forming aerial images of a portion of the aerial image formed by said first screen whereby the ıerial images formed by said second screen are differently ɔriented relative to each other from the relative orienta-:ions of the corresponding respective portions of said irst aerial images, a selected image plane and means for ·elaying the aerial images formed by said second screen :o said image plane.

2. An optical cryptographic device according to claim l in which the means for relaying the aerial images com-ɔrises an object lens including an aperture stop adjacent ;aid object lens for limiting the degree of overlap among ıdjacent images relative to the image plane.

3. An optical cryptographic device according to claim 2 in which different ones of said elements of one of said ;creen having different respective powers, and the object ens for relaying the aerial image to the image plane ıaving a depth of field sufficient to encompass all of :he aerial images formed by the second screen of optical :lements and to relay all of the aerial images in focus :o the image plane.

4. An optical cryptographic device according to claim 1 in which the screens of optical image forming elements comprise spherically curved optical elements.

5. An optical cryptographic device according to claim 4 in which the elements of said screens have an average dimension in their direction of curvature of about 1/10''.

6. An optical cryptographic device according to claim 1 in which the screens of optical image forming elements comprise cylindrical optical elements.

References Cited in the file of this patent

UNITED STATES PATENTS

| | | |
|---|---|---|
| 2,214,412 | Evans | Sept. 10, 1940 |
| 2,258,164 | Genies | Oct. 7, 1941 |
| 2,627,199 | O'Brien | Feb. 3, 1953 |
| 2,853,701 | Freedman et al. | Sept. 23, 1958 |
| 3,013,354 | Wiklund | Dec. 19, 1961 |
| 3,084,453 | Brown | Apr. 9, 1963 |